United States Patent [19]

Lee et al.

[11] Patent Number: 5,287,233
[45] Date of Patent: Feb. 15, 1994

[54] DIGITAL DATA STORAGE MAGNETIC TAPE SYSTEM COMPRISING A SINGLE CHIP PROCESSOR TO CONTROL A TAPE TENSION SERVO, AND A HEAD DRUM SERVO

[75] Inventors: David R. Lee, San Jose; Horatio H. Lo, Milpitas; Theodore D. Rees, Mountain View, all of Calif.

[73] Assignee: R-Byte Inc., San Jose, Calif.

[21] Appl. No.: 741,089

[22] Filed: Aug. 6, 1991

[51] Int. Cl.$^5$ ............................................. G11B 15/18
[52] U.S. Cl. ................................. 360/73.14; 360/71; 360/75; 360/77.12; 360/73.09
[58] Field of Search ................... 360/71, 85, 95, 73.01, 360/73.05, 73.11, 73.12, 73.13, 73.14, 74.1, 74.3, 74.2

[56] References Cited

U.S. PATENT DOCUMENTS

| | | | |
|---|---|---|---|
| 3,838,453 | 9/1974 | Buslik et al. | 360/70 |
| 3,860,960 | 1/1975 | Akamine | 360/85 |
| 3,883,785 | 5/1975 | Fulcher et al. | 318/314 |
| 4,060,840 | 11/1977 | Umeda | 360/130 |
| 4,258,399 | 3/1981 | Iijima et al. | 360/85 |
| 4,398,227 | 8/1983 | Anderson | 360/71 |
| 4,408,235 | 10/1983 | Ito | 360/71 |
| 4,410,919 | 10/1983 | Umeda | 360/85 |
| 4,459,625 | 7/1984 | Kawase | 360/85 |
| 4,479,081 | 10/1984 | Harris | 360/73.09 X |
| 4,510,534 | 4/1985 | Maeda | 360/10.3 |
| 4,536,806 | 8/1985 | Louth | 360/69 |
| 4,541,024 | 9/1985 | Seiben | 360/85 |
| 4,599,561 | 7/1986 | Takahashi et al. | 324/208 |
| 4,740,850 | 4/1988 | Ogata | 360/85 |
| 4,742,407 | 5/1988 | Smith et al. | 360/95 |
| 4,758,398 | 7/1988 | Nishida et al. | 360/85 |
| 4,800,450 | 1/1989 | Rodal et al. | 360/73.06 |
| 4,873,589 | 10/1989 | Inazawa et al. | 360/53 |
| 4,891,644 | 1/1990 | Noro | 341/128 |
| 4,899,233 | 2/1990 | Yoshida | 360/77.14 |
| 4,910,448 | 3/1990 | Tomisawa et al. | 318/599 |
| 5,101,311 | 3/1992 | Richmond | 360/71 X |
| 5,107,380 | 4/1992 | Fujiki et al. | 360/71 X |
| 5,150,263 | 9/1992 | Sakamoto et al. | 360/71 X |

Primary Examiner—Aristotelis Psitos
Assistant Examiner—Duncan Wilkinson
Attorney, Agent, or Firm—Lyon & Lyon

[57] ABSTRACT

This invention is an improved digital data storage magnetic tape transport servo-control system comprising a tape supply reel and supply reel motor, a tension transducer, a head drum having at least one read/write head secured thereto and coupled to a head drum motor, a capstan and a capstan motor, a pinch roller, a take-up reel and a take-up reel motor. A processor provides programmable digital control signals to and responsive to signals from the supply reel, the supply reel motor, the tension transducer, the head drum, the head drum motor, the capstan, the capstan motor, the take-up reel, and the take-up reel motor. The processor controls tape tension in cooperation with the supply reel motor and the tension transducer, controls tape speed in cooperation with the capstan and the capstan motor, controls take-up reel torque in cooperation with the take-up reel and the take-up reel motor, and controls head drum speed in cooperation with the head drum and the head drum motor.

11 Claims, 5 Drawing Sheets

DIGITAL DATA STORAGE MAGNETIC TAPE SYSTEM COMPRISING A SINGLE CHIP PROCESSOR TO CONTROL A TAPE TENSION SERVO, AND A HEAD DRUM SERVO

FIELD OF THE INVENTION

The present invention relates generally to the field of magnetic tape recording systems and more particularly to computer digital data magnetic tape storage servo-control systems.

BACKGROUND OF THE INVENTION

A magnetic tape storage systems is an efficient and inexpensive means for providing computer data storage functions such as disk back-up, archival storage, software distribution, data interchange, and real-time data recordation. Digital audio tape (DAT) provides flexible, high performance storage applicable to a wide variety of tasks. However, prior art DAT drives are primarily designed for audio systems and thus do not provide the required performance, reliability, or diagnostics necessary for computer data storage. Prior art DAT systems for computer storage typically use audio mechanisms and electronics with adapter chips to operate with the computer. Computer peripheral application of tape drives requires better data integrity and many more start/stop and high-speed search operations than audio tape drives, which were designed primarily for the continuous play of music or voice. Because of the more strenuous and more stringent requirements of computer data storage, such prior art systems do not provide the required performance and are not sufficiently reliable for such use.

A typical prior art digital audio tape (DAT) system has a read/write head coupled to a read/write amplifier and an interface unit communicating with a host unit, for example a computer. A tape transport control unit communicates with the head amplifier and the interface and with a digital capstan control unit having a power amplifier and a reel servo-control unit serving a supply reel and a take-up reel and their motors. A capstan and pinch roller is positioned between the read/write head and the take-up reel and controls tape speed over the head. Tape speed control is important for the generation of accurate track angles during writing. Controlled stopping is particularly important to avoid overshoot and tape creep. Typical DAT recording speeds of 8.15 mm/s require accelerations of 2 m/s² exerting considerable stresses on the tape.

Video recorders and some audio recorders utilize a rotating head for read and write. A typical rotating head-helical scan head is embedded between stationary upper and lower mandrels with the tape helically wrapped around the mandrels. The tape moves at a lower angular velocity than the rotating head to produce helically-written data of very high spatial density because of close track spacing. Addressing the closely-spaced tracks then requires accurate control of the linear positions of the tape around the head unit. By pressurizing the mandrels the tape is hydrostatically supported over the head by an air film at higher tape speeds. Tape speeds may be as high as 40 m/s in rotating head-helical scan systems. At such high data densities and tape speeds, accurate sensing requires precise head and tape speeds control and tape tracking control.

SUMMARY OF THE INVENTION

Accordingly, this invention provides an improved digital data storage magnetic tape transport servo-control system comprising a tape supply reel and supply reel motor, a tension transducer, a head drum having at least one read/write head secured thereto and coupled to a head drum motor, a capstan and a capstan motor, a pinch roller, a take-up reel and a take-up reel motor. A processor provides programmable digital control signals to and responsive to signals from the supply reel, the supply reel motor, the tension transducer, the head drum, the head drum motor, the capstan, the capstan motor, the take-up reel, and the take-up reel motor. The processor controls tape tension in cooperation with the supply reel motor and the tension transducer, controls tape speed in cooperation with the capstan and the capstan motor, controls take-up reel torque in cooperation with the take-up reel and the take-up reel motor, and controls head drum speed in cooperation with the head drum and the head drum motor.

The present invention performs the above-described operations using fewer parts, with reduced complexity while achieving higher quality performance than conventional systems. A software-intensive architecture is implemented in microprocessor firmware providing instructions to closed-loop servo-control systems to control tape tension, tape reels, capstan, and head drum. These systems significantly improve performance, reliability, cost, and manufacturability. The digital closed-loop servo systems utilize advanced signal processing techniques and adaptive servo algorithms implemented in firmware, to produce a low parts count system having higher bandwidths, greater shock, vibration, and temperature variation tolerance, and providing gentle tape handling for longer tape life.

The preferred embodiment contemplates a single chip controller to control all drive, compensation, calibration, data flow, and servo functions.

A further understanding of the nature and advantages of the present invention may be realized by reference to the Detailed Description of the Invention and the attached drawings.

DETAILED DESCRIPTION OF THE INVENTION

Figure 1:
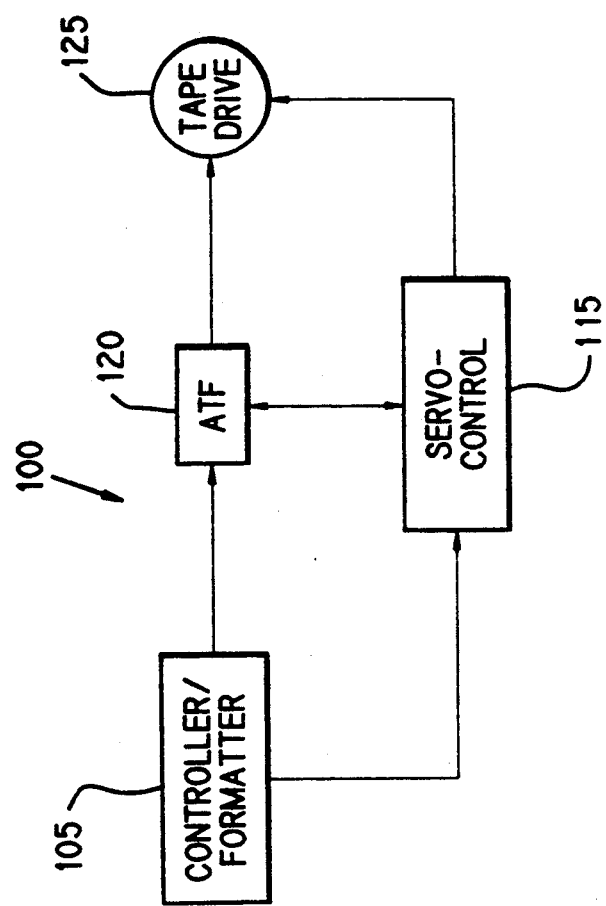
FIG. 1 is a block diagram of the scheme of a digital data storage (DDS) tape servo-control system according to the present invention.

FIG. 1 is a block diagram of the scheme of a digital data storage (DDS) digital audio tape (DAT) system 100 utilizing a servo-control system 115 under digital control by a software program implemented in firmware in system 100. Controller/formatter 105 controls all system functions for formatting, data movement, host interface communications, error correction, and diagnostics.

Controller/formatter 105 is described in detail in System and Formatter applications Ser. Nos. 07/741,783 and 07/740,755, respectively, which are hereby incorporated by reference.

Controller/formatter 105 is coupled to an automatic track follower (ATF) unit 120 and servo-control system 115, which are in turn coupled to a tape drive unit 125.

ATF unit 120 is described in patent application Ser. No. 07/741,088. The present invention is embodied in servo-control system 115, controller/formatter 105, and tape drive unit 125.

Broadly, the tape servo-control mechanisms of this invention are implemented by servo-control system 115 utilizing digital firmware control and include control of tape tension, tape speed, take-up reel torque, head drum speed, and tape extraction. These servo-control functions are implemented in the prior art primarily as analog systems with a few digital electronic circuits as described above. The present invention utilizes digital circuitry controlled by programmable firmware. Manual electrical adjustments have been eliminated either by the operation of the components or by self-calibrations according to the present invention.

Figure 2:
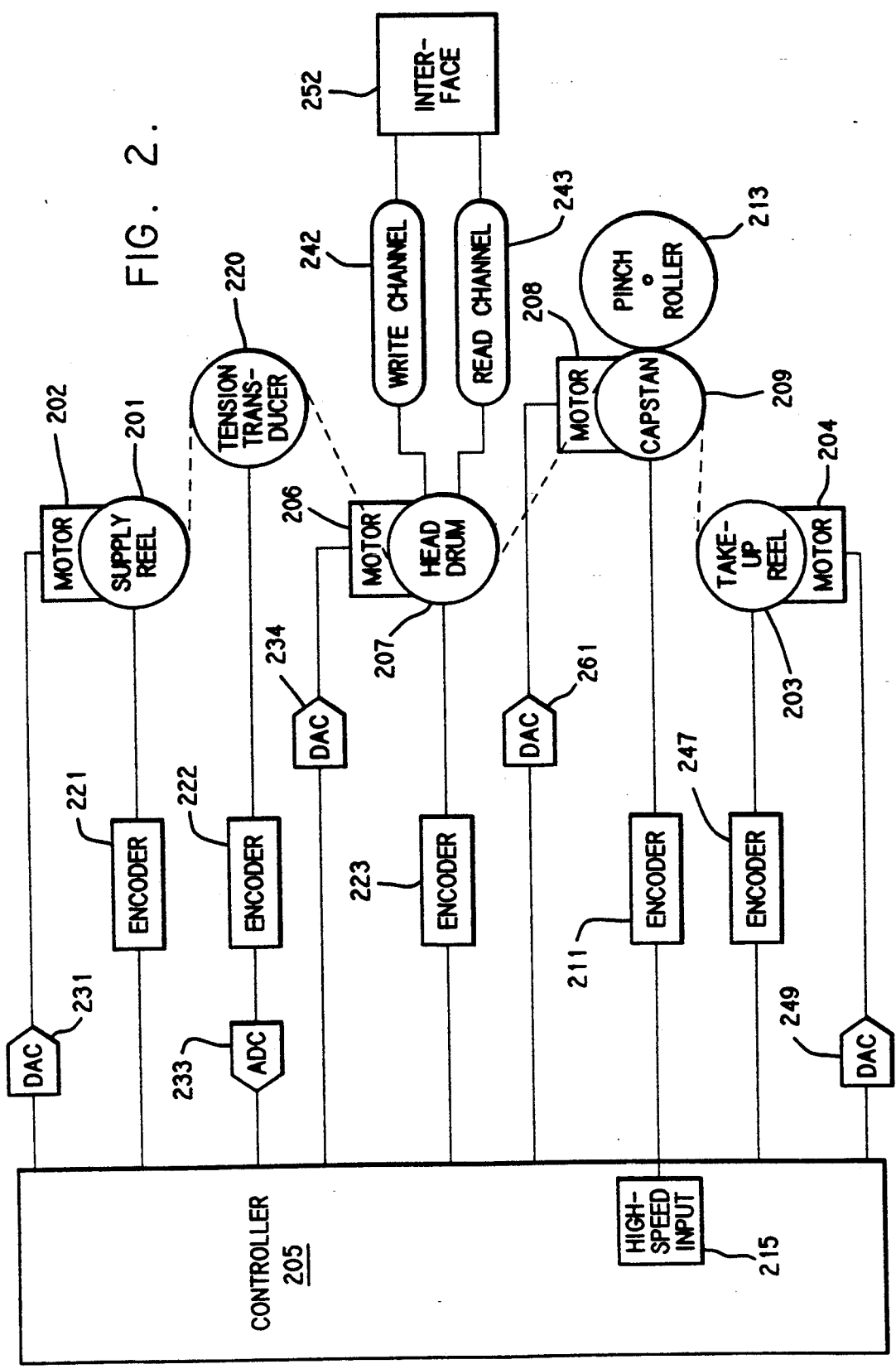
FIG. 2 is a schematic diagram of the preferred embodiment of the servo-control system of the present invention.

FIG. 2 is a schematic diagram of the preferred embodiment of the servo-control system 200 of the present invention. Independent supply reel motor 202, connected to supply reel 201 and independent take-up reel motor 204, connected to take-up reel 203, operate under full firmware control of controller 205. Two firmware-driven digital-to-analog converters (DACs) 231 and 249 supply control voltages to set motor torque and two firmware-driven digital output bits in controller 205 set motor directions. Supply reel motor 202 is coupled to controller 205 through at least one encoder 221. The magnetic tape, represented by dashed-line 210 is wound around a tension transducer 220 which is coupled to an encoder 222 and to controller 205 by an analog-to-digital converter 233. Take-up reel motor 204 is coupled to controller 205 through DAC 249. Take-up reel motor 204 is coupled to controller 205 through at least one encoder 247. In the preferred embodiment, reel encoders 221 and 247 are optical encoders.

Tape is read and written by a rotary R/W head 207 driven by a R/W head motor 206, which is also under full firmware control. A firmware-driven DAC 234 supplies control voltage and a firmware-driven digital output bit in controller 205 sets motor direction. Rotary head 207 is coupled to controller 205 through an encoder 223 to controller 205. In one embodiment, encoder 223 acts as a pulse generator and a frequency generator for calibration and other purposes. For a detailed description, see the Head Drum Calibration patent application Ser. No. 07/740,791. A write channel 242, and a read channel 243 couple rotary head 207 with an interface unit 252. In the preferred embodiment, rotary head encoder 223 is an inductive pick-up.

A capstan 209 controls tape speed over R/W head 207. Precise control is necessary for high performance operations. A capstan motor 208, connected to capstan 209 is under full firmware control of controller 205. An encoder 211 is coupled to capstan 209 for sensing angular position. In the preferred embodiment, encoder 211 is a magneto-resistive (MR) encoder. Capstan motor commutation is also under full firmware control of controller 205 as described in Commutation patent application Ser. No. 07/740,787. A DAC 261 supplies the control voltage to capstan motor 208 to set the torque. For some cases, coarse and fine DAC's may be advantageously utilized to supply voltages to capstan motor 208. Capstan 209 cooperates with a pinch roller 213 to secure tape 210 therebetween.

TAPE TENSION

Tension control is critical for computer DAT drives since it directly affects data reliability, tape wear, and head wear. To provide the required control, a servo with a bandwidth higher than those typically found in audio systems is preferred.

Figure 3:
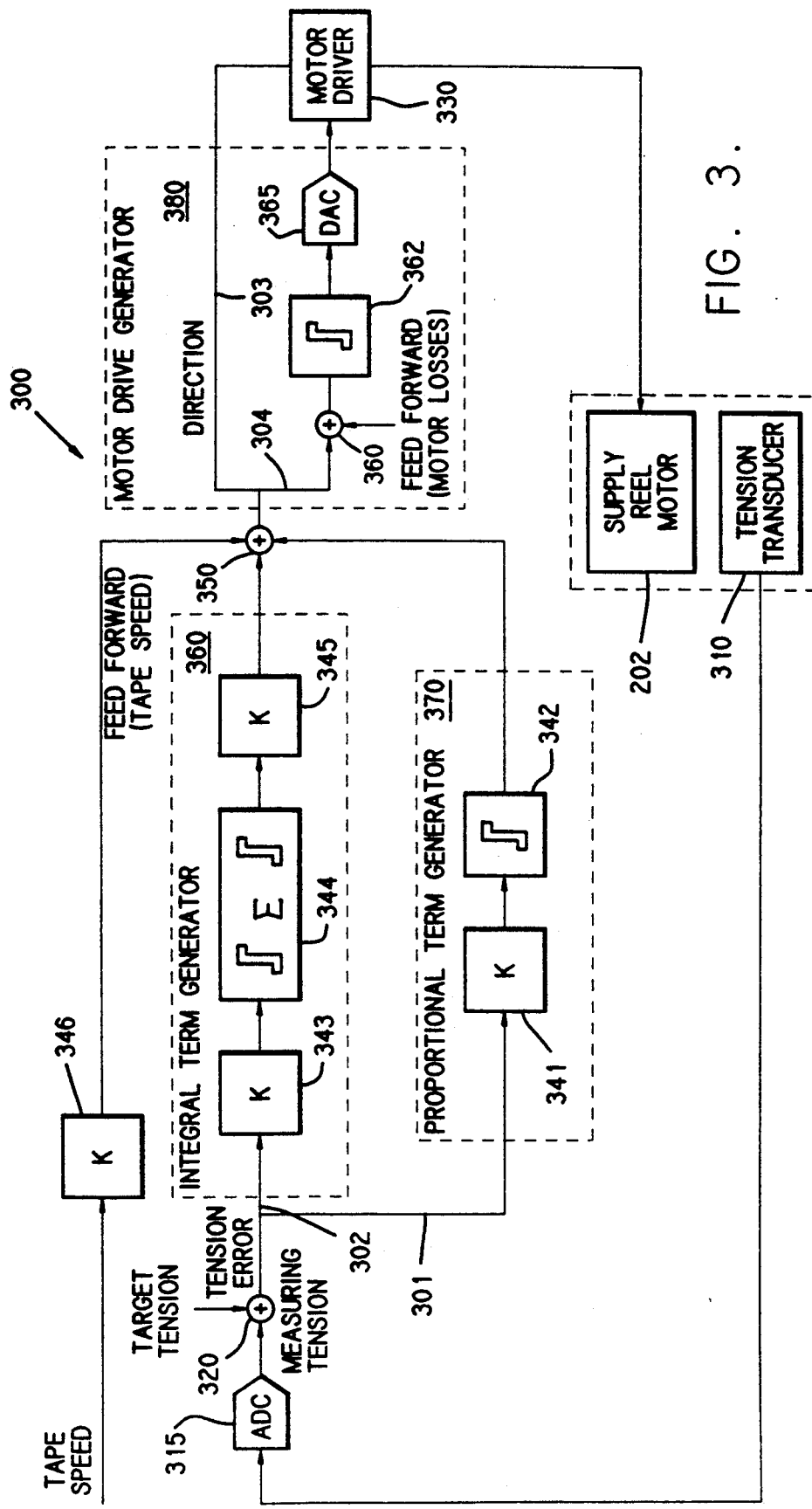
FIG. 3 is a schematic diagram of a tape tension servo-control system according to the present invention.

In operation, tape tension is controlled by a closed-loop servo system 300 shown in FIG. 3. A tension transducer 310 provides a mechanism relating tape tension to the position of some movable assemblage. For example, the position of a tension arm is sensed by a magnet attached to the movable tension arm and a stationary Hall sensor. The position of the tension arm indicates the tape tension. Such a tension transducer is described in allowed U.S. patent application Ser. No. 508,344. Tension transducer 310 produces a signal voltage which is a function of the tape tension. The signal voltage is converted to digital values by an analog-to-digital converter (ADC) 315. A desired, or target tension, is entered at an adder 320 and the tension signal is compared with the target tension. The difference, a tension error value, between target tension and tension signal voltage is transmitted to a proportional term generator 370 via a proportional path 301 to adjust a motor driver 330 and to integral term generator 360 via an integral path 302 which drives small long-term errors to zero. Proportional path 301 is coupled to a scaler 341 which is in turn coupled to a limiter 342, producing a proportional term. Scaler 341 scales, or multiplies by a constant, the value entered. Limiter 342 clips values to remain within predetermined upper and lower thresholds to prevent arithmetic overflow in later calculations. Integral path 302 is coupled to a scaler 343, a limiter/summer 344, and a scaler 345 which scale and sum (integrate) the tension error. Limiter/summer 344 limits, sums, and then limits again the digital signal to produce an integral term. Tape speed is entered at scaler 346 to constitute a feed forward term. In the preferred embodiment, the feed forward term is a function of the tape speed and the amount of tape pack on the supply reel and provides a steady state drive which decreases the gain requirements for stable servo-control operation. The feed forward term is added at an adder 350 to the proportional term and the integral term to produce a direction signal on direction line 303 and a drive value on drive line 304 to motor drive generator 380. A friction feed forward term is added at adder 360 to the drive value to compensate for motor friction losses, thereby producing a friction-compensated drive value. A limiter 362 limits the drive value plus friction feed forward term. This digital compensated drive value signal is converted to an analog signal by a digital-to-analog converter (DAC) 365 and transmitted to motor driver 330 which in turn sets the torque on supply reel motor 202. Limiters 342, 344, and 362 all act to prevent arithmetic overflows. Scaling factors in scalers 341, 343, 345, and 346 are chosen such that loop 300 is stable and the proportional and integral terms rapidly drive the tension error value to zero. The method of choosing optimal scaling factors to achieve these objectives is known to those skilled in the servo-control mechanism art and various methods are within the scope of this invention. For example, controller 205

(of FIG. 2) samples the signal (an exemplary 1000 times per second) and computes the servo loop calculations and control voltage adjustments to supply reel motor 202 to maintain proper operating tension. Tension servo loop 300 is operative during all tape operations including read/write, fast forward, rewind, and high-speed searches. Tension servo loop 300 responds rapidly to maintain proper head-to-media contact and to prevent loose wraps or poor wind which can cause tape damage and data loss.

In the preferred embodiment, the output of the tension transducer is a high bandwidth (30 Hz) signal which is advantageous for computer data uses. Audio systems, which have low start/stop and reposition frequency, typically utilize low bandwidth servos of less than 5 Hz or a mechanical drag brake providing even lower frequency response.

Environmental conditions such as high humidity can cause excessive drag around head drum 207 (FIG. 2) resulting in severe tension imbalance. If not detected, tape "run away" and subsequent tape damage may result. Abnormal tape drag is monitored by servo-control system 300 from signals from reel encoders 221 and 247 (FIG. 2) and the information is fed forward to a capstan servo-control system and a take-up reel servo-control system (both described below).

Open and closed-loop test measurements of tension control servo 300 can be simply performed since no additional hardware is necessary. The tests can be performed by loading firmware that opens the loop, injects a swept signal and transmits the response (in for example, a Bode plot) to a serial port for analysis. Similarly, the transfer function of tension transducer 310 may be monitored and calibrated.

In the preferred embodiment of the present invention, tension transducer 310 is calibrated during the manufacturing process. A mechanical calibration is first performed by balancing the tension arm against a known load and turning an adjustment screw to set the proper spring force on the tension arm. An electrical calibration is then performed by a measurement by controller 205 of the output of the tension sensor unit at the known load. This value is stored in controller 205 in a non-volatile EEPROM representing the target tension to be used as a reference.

TAPE SPEED

The function of the capstan is to control the speed of the tape over the read/write head. Precise control of the capstan results in higher performance levels. Prior art capstan control systems typically utilized Hall sensors and analog commutation circuits. The present invention eliminates the Hall sensors and utilizes digital circuits to control the capstan, thereby significantly reducing the cost of the capstan. Further, tighter control of speed during read/write, and compensation for encoder and amplifier offset errors provides an optimized commutation timing of the motors that increases motor efficiency by 50% over analog systems. The improvement is achieved by the capability of selecting the optimum switching point of commutation for each individual coil of the motor independent of mechanical limitations. The capstan commutation system is described in detail in Commutation patent application Ser. No. 07/740,787.

Figure 4:
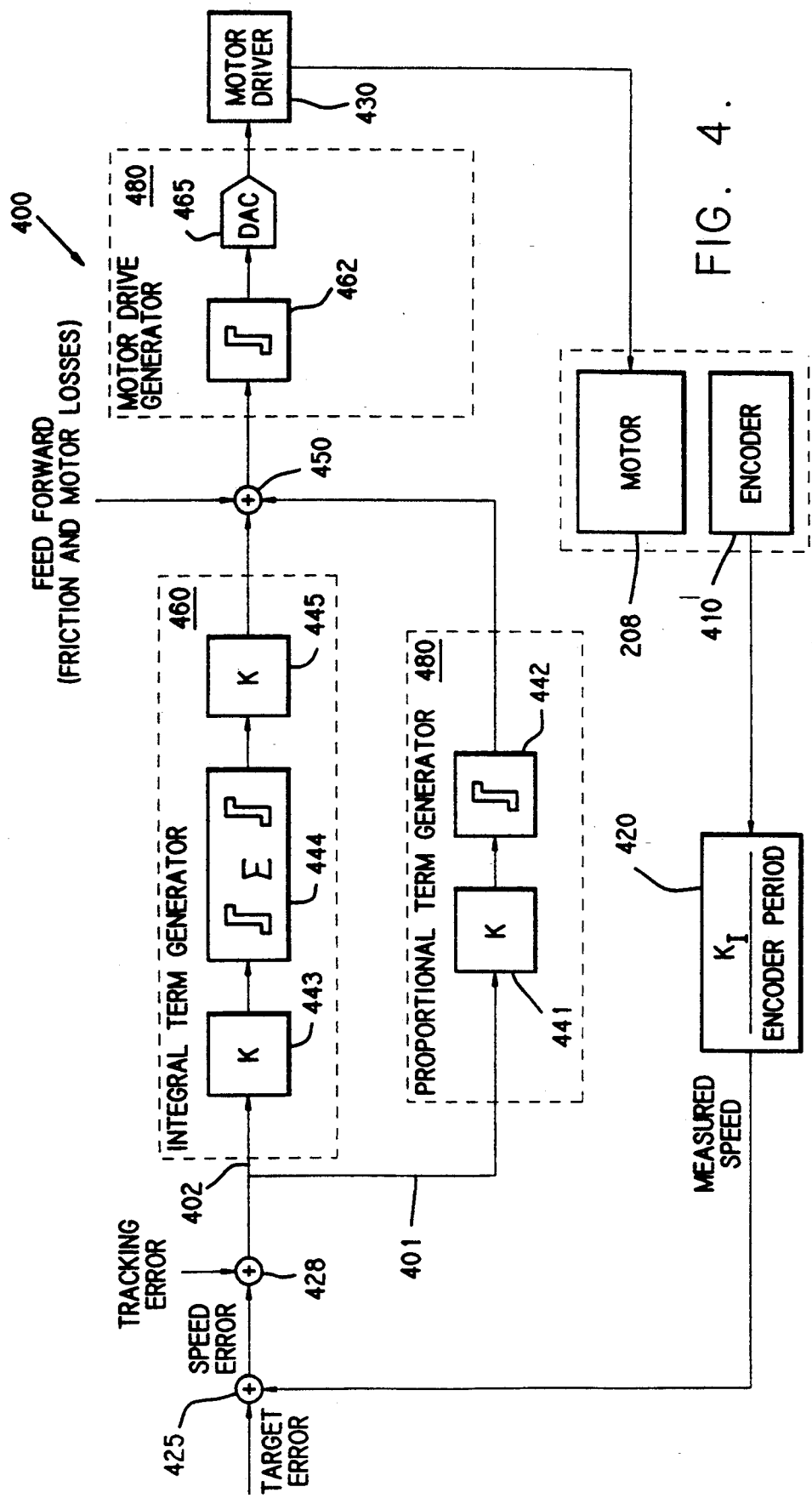
FIG. 4 is a schematic diagram of a capstan (tape) speed servo-control system according to the present invention.

FIG. 4 is a schematic block diagram of a capstan servo-control loop 600. Capstan encoder 410 transmits interrupts directly to the high-speed input interrupt/time stamping unit (HSI) 215 of controller 205 (FIG. 2) where they are used to compute required capstan motor parameters to minimize any capstan speed errors. This is achieved by determining the measured tape speed from capstan encoder 410 which produces a periodic signal having a period that is inversely proportional to the capstan speed and hence to the tape speed also. The encoder period is converted to a measured speed by inversion and scaling at invertor/scaler 420. A target tape speed, determined from the requirements of the operation at hand, is fed into a target speed adder 425 and compared with the measured speed, producing thereby a speed difference, or capstan (or tape) speed error. A tracking error term is fed into a tracking error adder 428 and added to the speed error to maintain correct tape tracking. For details of tape tracking, see the automatic track follower (ATF) patent application Ser. No. 07/741,088. The tracking-corrected speed error from adder 428 is then split into a proportional path 401 to a proportional term generator 470 to proportionally adjust a motor driver 430 and an integral path 402 to integral term generator 460 which drives small long-term errors to zero. Proportional path 401 is coupled to a scaler 441 which is in turn coupled to a limiter 442, producing a proportional term. Scaler 441 scales, or multiplies by a constant, the value entered. Limiter 442 clips values to remain within predetermined upper and lower thresholds to prevent arithmetic overflow in later calculations. Integral path 402 is coupled to a scaler 443, a limiter/summer 444, and a scaler 445 which scale and sum (integrate) the speed error. Limiter/summer 444 limits, sums, and then limits again the digital signal to produce an integral term. A capstan feed forward term is fed into adder 450 which compensates for friction and other motor losses and provides a steady state drive which decreases the gain requirements for stable servo-control operation. The feed forward term is added at adder 450 to the proportional term and the integral term and transmitted to motor drive generator 480 to produce a capstan drive value for the capstan motor. A limiter 462 limits the capstan drive value plus motor loss feed forward term producing a compensated capstan drive value. This digital signal is converted to an analog signal by a digital-to-analog converter (DAC) 465 and transmitted to capstan motor driver 430 which in turn sets the torque on capstan motor 208. Limiters 442, 444, and 462 all act to prevent arithmetic overflows. Scaling factors in scalers 441, 443, and 445, are chosen such that loop 400 is stable and the proportional and integral terms rapidly drive the capstan speed error value to zero. The method of choosing optimal scaling factors to achieve these objectives is known to those skilled in the servo-control mechanism art and various methods are within the scope of this invention.

In normal operation when the tape speed is controlled by the capstan servo loop, take-up reel motor 204 is driven to share the load between take-up reel motor 204 and capstan motor 208. The take-up reel motor torque is controlled by software through DAC 249. The torque value is set open-loop, but the value is adjusted according to the diameter of the tape pack on take-up reel 203.

It is sometimes desirable to move the tape at higher speeds than capstan motor 208 can support. For example, the DAT tape format is designed to allow search operations at up to 200 times the normal read/write tape speed. For this type of operation, pinch roller 213 is disposed away from capstan 209, effectively decoupling the tape from capstan 209. The tape speed is thus controlled by take-up reel 203 rather than capstan motor 208 since take-up reel motor 204 and encoder 247 effectively replace capstan motor 208 and encoder 211 in the tape speed servo loop. The diameter of the tape pack on take-up reel 203 is considered in the conversion. Additionally, other servo loop parameters are adjusted to maintain stable operation in this high-speed mode. Because the frequency of take-up reel encoder events is low at low tape speeds, it is difficult to achieve stable operation at low speeds with take-up reel control. To avoid this problem, tape speeds up to 32 times normal read/write speeds are always controlled with capstan motor 208 and the take-up reel control method is used only at higher speeds.

In the preferred embodiment, tape speed is controlled by a 50 Hz bandwidth closed-loop servo system. The output of capstan encoder 211, coupled to capstan motor 208, is transmitted to high-speed input (HSI) 215 on controller 205 (FIG. 2) where it is time-stamped. Firmware in controller 205 determines tape speed by measuring the time between encoder edges. Controller 205 then performs the servo loop calculations and transmits the compensation information through DAC 465 to adjust the control voltage to capstan motor 208 as required to maintain proper tape speed. In a preferred embodiment of the present invention, compensations for encoder variations are performed by automatic electronic calibration.

In the preferred embodiment of the invention, on power-up of system 200, capstan motor 208 undergoes a learning routine under firmware control from controller 205 to build a table of compensation values for encoder tooth-to-tooth variations and to find the optimal commutation points relative to magneto-resistive encoder 211 teeth. Upon learning completion, the exact capstan encoder position is tracked so that proper compensation and commutation points are preserved. A quadrature signal (two channels running 90 degrees out of phase) is required on capstan motor magneto-resistive encoder 211 to achieve this. An optimizing Commutation system which can be advantageously utilized in capstan motor 208 of the present invention is described in detail in Commutation patent application Ser. No. 07/741,787, which is hereby incorporated by reference.

HEAD DRUM SPEED CONTROL

Figure 5:
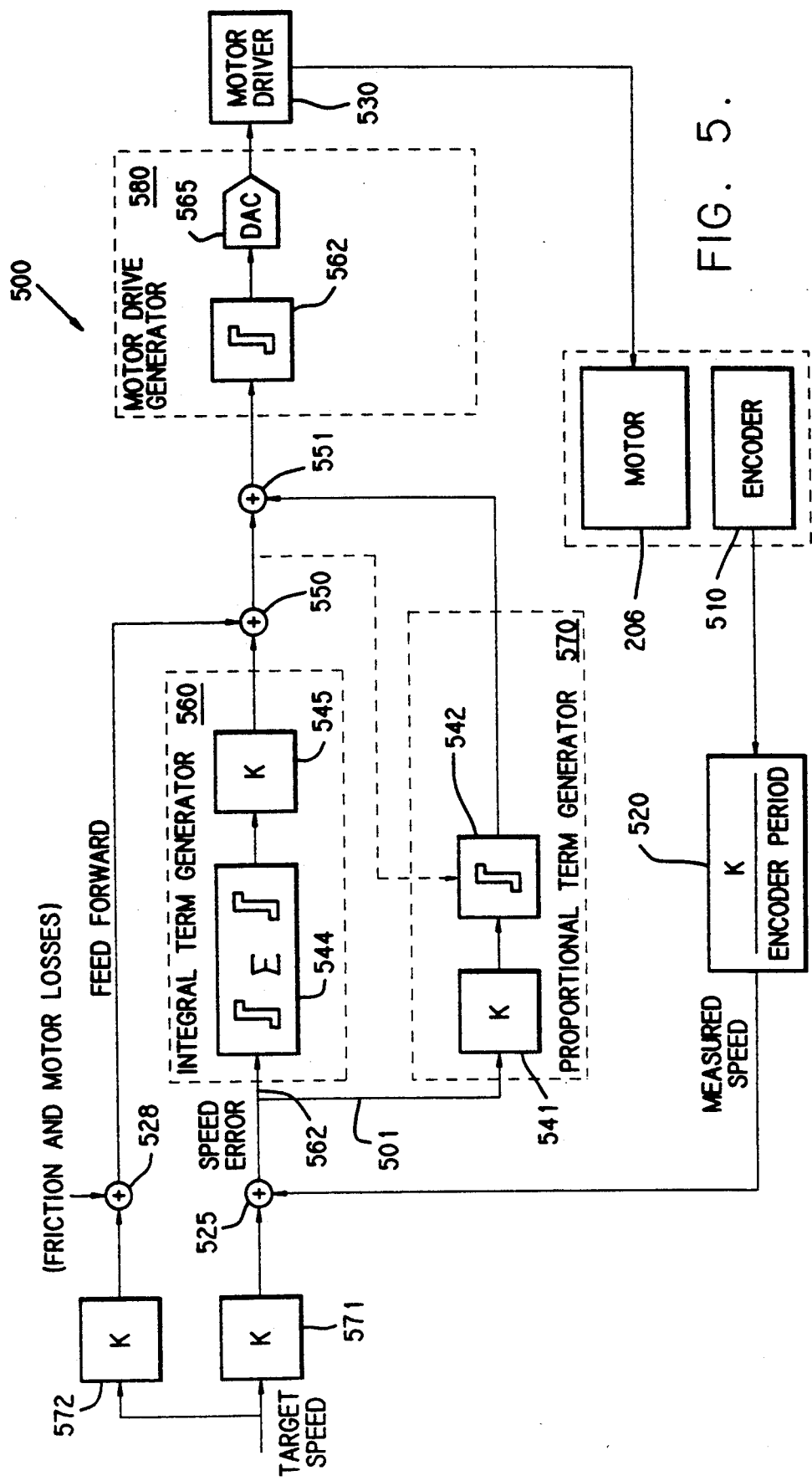
FIG. 5 is a schematic diagram of a head drum servo-control system according to the present invention.

FIG. 5 is a schematic block diagram describing a head drum servo-control system 500. An encoder 510 produces a periodic signal having a period that is inversely proportional to the head drum speed. In the preferred embodiment, head drum encoder 223 (FIG. 2, exemplified by encoder 510 in FIG. 5) is a 24-line encoder that transmits interrupts directly to the high speed input interrupt and time stamping unit (HSI) 215 of controller 205. Controller 205 can measure the encoder period with high accuracy. The encoder period signal is converted to a measured speed by inversion and scaling at invertor/scaler 520. A target head drum speed is scaled at scaler 571 and compared with the measured head drum speed at adder 525 which generates a head drum speed error signal. The head drum speed error signal is then split into a proportional path 501 to proportional term generator 570 to adjust a head drum motor driver 530 and an integral path 502 to integral term generator 560 which drives small long-term errors to zero. Proportional path 501 is coupled to a scaler 541 which is in turn coupled to a limiter 542, producing a proportional term. Scaler 541 scales, or multiplies by a constant, the value entered. Limiter 542 clips values to remain within predetermined upper and lower thresholds to prevent arithmetic overflow in later calculations. Integral path 502 is coupled to a limiter/summer 544 which is coupled to a scaler 545 which scale and sum (integrate) the head drum speed error. Limiter/summer 544 clips, sums, and then clips again the digital signal to produce an integral term. Head drum target speed is also transmitted to a scaler 572 and then to an adder 528. A compensation for friction and other motor losses is entered at adder 528 and a head drum feed forward term is generated which is the sum of the scaled head drum target speed and the friction and motor losses compensation term. This provides a steady state drive which decreases the gain requirements for stable servo-control operation. The head drum feed forward term is added at adder 550 to the integral term. This sum is then added to the proportional term at adder 551 and transmitted to motor drive generator 580 to produce a head drum drive value for head drum motor 206. A limiter 562 limits the head drum drive value plus motor loss feed forward term producing a compensated head drum drive value. This digital signal is converted to an analog signal by a digital-to-analog converter (DAC) 565 and transmitted to head drum motor driver 530 which in turn sets the torque on head drum motor 206. Limiters 542, 544, and 562 all act to prevent arithmetic overflows. Scaling factors in scalers 541, 545, 571, and 572 are chosen such that loop 500 is stable and the proportional and integral terms rapidly drive the head drum speed error value to zero. The method of choosing optimal scaling factors to achieve these objectives is known to those skilled in the servo-control mechanism art and various methods are within the scope of this invention.

In an embodiment of this invention, the limiting of the proportional term is variably dependent on the output of adder 550, as indicated by the dashed line from the output of adder 550 to limiter 542. The variable limitation takes the sum of the integral term and the head drum feed forward term to control the clipping of the proportional term, thereby generating symmetric upper and lower limiting over a wider range of values. Symmetric limiting of the proportional term over a wider range of values is important because it provides linear servo response over a wider range. For example, denote the proportional term as A, the sum of the integral term and the feed forward term as B, and the sum of all these terms as C. For the case of a number range for arithmetic operations is $-127$ to $+127$ and a fixed limit of $-50$ to $+50$ on A, if B is in the range $-77$ to $+77$, A can be clipped within its fixed limit symmetrically, without overflowing the number range. However, if the B value is outside the range $-77$ to $+77$ and C is constrained to be within the number range, there will be an asymmetrical clipping of A. For example, if B=100 and A=$-50$, A is not clipped and C=50, whereas if A=$+50$, A is clipped to $+27$ so that c remains in the number range at 127. Such a system servo is biased to respond more strongly to changes of the proportional term in the negative direction than in the positive direction, thereby producing nonlinear behavior. In the present invention, the clipping limit of A is varied in response to the value of B, so that the clipping level of A remains symmetric over a wider range. For example, the clipping limits of A are to ($|B|-127$) to ($127-|B|$), so that the sum $C=A+B$ is always in the number range $-127$ to $+127$ for all possible values of B. For example, when $B=100$, the clipping limits on A are set to $-27$ to $+27$, and A will always be clipped symmetrically. In this example, the range of symmetric limiting has been extended from $-77 \leq B \leq +77$ to $-127 \leq B \leq +127$.

In summation, utilizing servo loop 500, firmware in controller 205 computes the head drum motor voltage required to maintain head drum 207 at the desired speed and transmits this information through DAC 525 to motor driver 530 to control head drum motor 206.

Head drum servo-control loop 500, in the preferred embodiment, has a bandwidth of 30 Hz. Head drum angular speed control is tighter and the efficiency is improved over analog systems. Head drum servo-control loop 500 can thus respond to changes in tape tension faster than conventional devices.

In the preferred embodiment, all the servo-control systems described operate under the control of controller 205, therefore simple feed forward is provided between the servo-control systems to further improve tape transport operations.

CONTROLLER

In the preferred embodiment of the present invention, a single microprocessor performs all the operations described above for controller 205. These operations include drive control, compensation, calibration, data flow, and servo-control functions.

Because of firmware intelligence embedded in the microprocessor, adaptation and compensation for specific unit, time, and temperature variations are implemented automatically in contrast with prior art systems. Wear and ageing of electromechanical devices can be retarded and performance enhanced by automatic tune-ups such as re-calibrations, compensations, and adjustments. Examples of automatic adjustments performed by this invention include tape tension, drum revolution phasing, ATF pilot level, data strobe frequency, write current, and read threshold. Examples of automatic calibration include the head drum index offset, capstan encoder tooth variation, tape length sensing, and tension transducer. Further, optimized Hall-less commutation timing of the capstan motor increases motor efficiency by 50%. The improved efficiency of the software/firmware system of the present invention lowers power consumption, reduces heat generation, and increases environmental range.

As an example of an embodiment of the controller utilized in the present invention, a relatively inexpensive 1.5 mips CMOS microprocessor at 12 Mhz may be advantageously utilized at low power (200 mW). The preferred embodiment utilizes an eight-input 10-bit ADC with sample-and-hold, 230 bytes of on-chip RAM, two 16-bit timers with 1 $\mu$sec resolution. A high-speed input unit having four inputs with high-speed capture and a high-speed output having six outputs with high-speed capture are also preferably utilized.

Details of the preferred implementation, including pin-outs and circuit logic are described in patent applications for the System, Formatter, and ATF (Ser. Nos. 07/741,783, 07/740,755, 07/741,088, respectively) which are hereby incorporated by reference.

An embodiment of this invention can be found in Digital Data Tape Storage System Model RB100 manufactured by R-Byte of San Jose, Calif.

While the above description provides a full and complete description of the preferred embodiments of the present invention, various modifications, alternate constructions, and equivalents known to those in the art may be employed while still remaining within the scope of the invention. Therefore, the above description and illustrations should not be construed as limiting the scope of the invention which is defined by the following claims.

What is claimed is:

1. In a digital data storage magnetic tape system having a supply reel coupled to a supply reel motor, a take-up reel coupled to a take-up reel motor, a capstan, a tape tension servo-control system comprising:

tension transducer means for generating a measured tape tension signal responsive to the tape tension;

analog-to-digital converter (ADC) means, coupled to said tension transducer means, for converting the measured tape tension signal to digital representation;

first adder means, coupled to said ADC means, for comparing the measured tape tension signal to a target tension, and for generating a tension error value therefrom;

motor driver means, coupled to the supply reel motor, for driving the supply reel motor;

proportional term generating means, coupled to said second adder means, for generating a proportional adjusting term for said motor driver means, said proportional term generating mean having proportional term scaler means for scaling said tension error value, proportional term limiter means, coupled to said proportional term scaler means, for limiting said scaled tension error value within predetermined upper and lower thresholds to prevent arithmetic overflow;

integral term generating means, coupled to said first adder means, for driving small long-term signal errors to zero;

scaler means for scaling a tape speed being entered thereto and for generating a tape speed feed forward term representative of the tape speed and the amount of tape pack on the supply reel;

second adder means, coupled to said proportional term generating means, to said integral term generating means, and to said scaler means, and further coupled to said motor driver means, for adding said proportional term, said integral term, and said tape speed feed forward term, and generating therefrom a direction signal for transmission to said motor driver means, and a drive value signal;

third adder means, having a motor energy loss term entered thereto, coupled to said second adder means, for adding said motor energy loss term to said drive value signal and thereby generating a motor energy loss-compensated drive value signal;

limiter means, coupled to said third adder means, for limiting said motor energy loss-compensated drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited drive value on the supply reel motor; and controller means, coupled to said tension transducer means, to said first, second, and third adder means, to said scaler means, to said limiter means, to said proportional term generating means, to said integral term generating means, and to said motor driver means, and having inputs for the tape speed, target tension, and motor energy loss, for controlling the tape tension.

2. In a digital stage storage magnetic tape system having a supply reel coupled to a supply reel motor, a take-up reel coupled to a take-up reel motor, a capstan, a tape tension servo-control system comprising:

tension transducer means for generating a measured tape tension signal responsive to the tape tension;

analog-to-digital converter (ADC) means, coupled to said tension transducer means, for converting the measured tape tension signal to digital representation;

first adder means, coupled to said ADC means, for comparing the measured tape tension signal to a target tension, and for generating a tension error value therefrom.

motor driver means, coupled to the supply reel motor, for driving the supply reel motor;

proportional term generating means, coupled to said second adder means, for generating a proportional adjusting term for said motor driver means;

integral term generating means, coupled to said first adder means, for driving small long-term signal errors to zero, said integral term generating means having first integral term scaler means for scaling said tension error value, integral term limiter/summer means, coupled to said first integral term scaler means, for limiting said scaled tension error value, summing said limited scaled tension error value, and limited said summed limited scaled tension error value, second integral term scaler means, coupled to said integral term limiter/scaler means, for scaling said limited summed limited scaled tension error value;

scaler means for scaling a tape speed being entered thereto and for generating a tape speed feed forward term representative of the tape speed and the amount of tape pack on the supply reel;

second adder means, coupled to said proportional term generating means, to said integral term generating means, and to said scaler means, and further coupled to said motor driver means, for adding said proportional term, said integral term, and said tape speed feed forward term, and generating therefrom a direction signal for transmission to said motor driver means, and a drive value signal;

third adder means, having a motor energy loss term entered thereto, coupled to said second adder means, for adding said motor energy loss term to said drive value signal and thereby generating a motor energy loss-compensated drive value signal;

limiter means, coupled to said third adder means, for limiting said motor energy loss-compensated drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited drive value on the supply reel motor; and controller means, coupled to said tension transducer means, to said first, second, and third adder means, to said scaler means, to said limiter means, to said proportional term generating means, to said integral term generating means, and to said motor driver means, and having inputs for the tape speed, target tension, and motor energy loss, for controlling the tape tension.

3. In a digital data storage magnetic tape system having a supply reel coupled to a supply reel motor, a take-up reel coupled to a take-up reel motor, a capstan, a tape tension servo-control system comprising:

tension transducer means for generating a measured tape tension signal responsive to the tape tension, said tension transducer means having a high bandwidth signal being substantially 30 Hz;

analog-to-digital converter (ADC) means, coupled to said tension transducer means, for converting the measured tape tension signal to digital representation;

first adder means, coupled to said ADC means, for comparing the measured tape tension signal to a target tension, and for generating a tension error value therefrom;

motor driver means, coupled to the supply reel motor, for driving the supply reel motor;

proportional term generating means, coupled to said second adder means, for generating a proportional adjusting term for said motor driver means;

integral term generating means, coupled to said first adder means, for driving small long-term signal errors to zero;

scaler means for scaling a tape speed being entered thereto and for generating a tape speed feed forward term representative of the tape speed and the amount of tape pack on the supply reel;

second adder means, coupled to said proportional term generating means, to said integral term generating means, and to said scaler means, and further coupled to said motor driver means, for adding said proportional term, said integral term, and said tape speed feed forward term, and generating therefrom a direction signal for transmission to said motor driver means, and a drive value signal;

third adder means, having a motor energy loss term entered thereto, coupled to said second adder means, for adding said motor energy loss term to said drive value signal and thereby generating a motor energy loss-compensated drive value signal;

limiter means, coupled to said third adder means, for limiting said motor energy loss-compensated drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited drive value on the supply reel motor; and controller means, coupled to said tension transducer means, to said first, second, and third adder means, to said scaler means, to said limiter means, to said proportional term generating means, to said integral term generating means, and to said motor driver means, and having inputs for the tape speed, target tension, and motor energy loss, for controlling the tape tension.

4. In a digital data storage magnetic tape system having a capstan coupled to a capstan motor, a capstan servo-control system comprising:

- capstan encoder means, coupled to the capstan, for generating a periodic signal having a period being inversely proportional to the capstan rotational speed and the tape speed;
- invertor/scaler means, coupled to said capstan encoder means, for converting said capstan encoder period to a measured capstan speed;
- first adder means, coupled to said invertor/scaler means, for comparing said measured capstan speed to a capstan target speed, and for generating a capstan speed error value therefrom;
- second adder means, coupled to said first adder means, for adding a tracking error term to said speed error value and for generating a tracking-corrected speed error value;
- motor driver means, coupled to the capstan motor, for driving the capstan motor;
- proportional term generating means, coupled to said second adder means, for generating an adjusting proportional term for said motor driver means, said proportional generating means having a proportional term scaler means for scaling said capstan speed error value and
- a proportional term limiter means, coupled to said proportional term scaler means, for limiting said scaled capstan speed error value within predetermined upper and lower thresholds to prevent arithmetic overflow;
- integral term generating means, coupled to said second adder means, for driving small long-term errors to zero;
- third adder means, having a motor energy loss term input thereto and being coupled to said proportional term generating means and to said integral term generating means, for adding said proportional term, said integral term, and said motor energy loss term, thereby generating a motor energy loss compensated-capstan drive value;
- limiter means, coupled to said third adder means, for limiter said motor energy loss-compensated capstan drive value signal;
- digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited capstan drive value on the capstan; and
- controller means, coupled to said capstan encoder means, to said interior/scaler means, to said first, second, and third adder means, to said limiter means, to said proportional term generating means, to said integral term generating means, and having inputs for the tape speed, tracking error term, and motor energy loss, for controlling the tape speed.

5. In a digital data storage magnetic tape system having a capstan coupled to a capstan motor, a capstan servo-control system comprising:

- capstan encoder means, coupled to the capstan, for generating a periodic signal having a period being inversely proportional to the capstan rotational speed and the tape speed;
- invertor/scaler means, coupled to said capstan encoder means, for converting said capstan encoder period to a measured capstan speed;
- first adder means, coupled to said invertor/scaler means, for comparing said measured capstan speed to a capstan target speed, and for generating a capstan speed error value therefrom;
- second adder means, coupled to said first adder means, for adding a tracking error term to said speed error value and for generating a tracking-corrected speed error value;
- motor driver means, coupled to the capstan motor, for driving the capstan motor;
- proportional term generating means, coupled to said second adder means, for generating an adjusting proportional term for said motor driver means;
- integral term generating means, coupled to said second adder means, for driving small long-term errors to zero, said integral term generating means having a first integral term scaler means for scaling said capstan speed error value, an
- integral term limiter/summer means, coupled to said first integral term scaler means, for limited said scaled capstan speed error value, summing said limited scaled capstan speed error value, and limiting said summed limited scaled capstan speed error value and
- second integral term scaler means, coupled to said integral term limiter/summer means, for scaling said limited summed limited scaled capstan speed error value;
- third adder means, having a motor energy loss term input thereto and being coupled to said proportional term generating means and to said integral term generating means, for adding said proportional term, said integral term, and said motor energy loss term, thereby generating a motor energy loss compensated-capstan drive value;
- limiter means, coupled to said third adder means, for limiting said motor energy loss-compensated capstan drive value signal;
- digital-to-analog converter (DAC) means, coupled to said limiter means and to said motor driver means, for converting said motor energy loss-compensated drive value signal to an analog signal and transmitting said analog signal ti said motor driver means, which in turn sets a torque responsive to said motor energy loss-compensated limited capstan drive value on the capstan; and
- controller means, coupled to said capstan encoder means, to said invertor/scaler means, to said first, second, and third adder means, to said limiter means, to said proportional term generating means, to said integral term generating means, and having inputs for the tape speed, tracking error term, and motor energy loss, for controlling the tape speed.

6. In a digital data storage magnetic tape system having a capstan coupled to a capstan motor, a capstan servo-control system comprising:

- capstan encoder means, coupled to the capstan, for generating a periodic signal having a period being inversely proportional to the capstan rotational speed and the tape speed;
- invertor/scaler means, coupled to said capstan encoder means, for converting said capstan encoder period to a measured capstan speed;
- first adder means, coupled to said invertor/ scaler means, for comparing said measured capstan speed to a capstan target speed, and for generating a capstan speed error value therefrom;

second adder means, coupled to said first adder means, for adding a tracking error term to said speed error value and for generating a tracking-corrected speed error value;

motor driver means, coupled to the capstan motor, for driving the capstan motor;

proportional term generating means, coupled to said second adder means, for generating an adjusting proportional term for said motor driver means;

integral term generating means, coupled to said second adder means, for driving small long-term errors to zero;

third adder means, having a motor energy loss term input thereto and being coupled to said proportional term generating means and to said integral term generating means, for adding said proportional term, said integral term, and said motor energy loss term, thereby generating a motor energy loss compensated-capstan drive value;

limiter means, coupled to said third adder means, for limiting said motor energy loss-compensated capstan drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited capstan drive value on the capstan; and controller means, coupled to said capstan encoder means, to said invertor/scaler means, to said first, second, and third adder means, to said limiter means, to said proportional term generating means, to said integral term generating means, and having inputs for the tape speed, tracking error term, and motor energy loss, for controlling the tape speed and wherein said capstan servo-control system has a bandwidth being substantially 50 Hz.

7. In a digital data storage magnetic tape system having a rotary head drum coupled to a head drum motor, a head drum servo-control system comprising:

head drum encoder means, coupled to the head drum for generating a periodic signal having a period being inversely proportional to the head drum rotational speed;

invertor/scaler means, coupled to said head drum encoder means, for converting said head drum encoder period to a measured head drum speed;

first scaler means, having a head drum target speed input, for scaling the head drum target speed;

second scaler means, having a head drum target speed input, for scaling the head drum target speed;

first adder means, coupled to said invertor/scaler means and to said first scaler means, for comparing said measured head drum speed to said scaled head drum target speed, and for generating a head drum speed error value therefrom;

second adder means, coupled to said second scaler means, and having a motor energy loss term input thereto, for adding said scaled head drum target speed and said motor energy loss term and for generating a motor energy loss-compensated head drum target speed feed forward value;

motor driver means, coupled to the head drum motor, for driving the head drum motor;

proportional term generating means, coupled to said first adder means, for generating a proportional adjusting term for said motor driver means, said proportional term generating means having a proportional term scaler for scaling said head drum speed error value and a proportional term limiter means, coupled to said proportional term scaler means, for limiting said scaled head drum speed error value within predetermined upper and lower thresholds to prevent arithmetic overflow;

integral term generating means, coupled to said first adder means, for driving small long-term errors to zero;

third adder means, coupled to said integral term generating means and to said second adder means, for adding said integral term and said feed forward term, thereby generating a feed forward-compensated integral term;

fourth adder means, coupled to said third adder means, and to said proportional term generating means, for adding said feed forward-compensated integral term to said proportional term, thereby generating a motor energy loss-compensated head drum drive value signal;

limiter means, coupled to said fourth adder means, for limiting said motor energy loss-compensated head drum drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited head drum drive value on the head drum; and controller means, coupled to said head drum encoder means, to said invertor/scaler means, to said first, second, third, and fourth adder means, to said proportional term generating means, to said integral term generating means, and having inputs for the target speed and motor energy loss, for controlling the head drum rotational speed.

8. In a digital data storage magnetic tape system having a rotary head drum coupled to a head drum motor, a head drum servo-control system comprising:

head drum encoder means, coupled to the head drum, for generating a periodic signal having a period being inversely proportional to the head drum rotational speed;

invertor/scaler means, coupled to said head drum encoder means, for converting said head drum encoder period to a measured head drum speed;

first scaler means, having a head drum target speed input, for scaling the head drum target speed;

second scaler means, having a head drum target speed input, for scaling the head drum target speed;

first adder means, coupled to said invertor/scaler means and to said first scaler means, for comparing said measured head drum speed to said scaled head drum target speed, and for generating a head drum speed error value therefrom;

second adder means, coupled to said second scaler means, and having a motor energy loss term input thereto, for adding said scaled head drum target speed and said motor energy loss term and for generating a motor energy loss-compensated head drum target speed feed forward value;

motor driver means, coupled to the head drum motor, for driving the head drum motor;

proportional term generating means, coupled to said first adder means, for generating a proportional adjusting term for said motor driver means;

integral term generating means, coupled to said first adder means, for driving small long-term errors to zero, said integral term generating means having an integral term limiter/summer means for limiting said head drum speed error value, summing said limited head drum speed error value, and limiting said summed limited head drum speed error value and a second integral term scaler means, coupled to said integral term limiter/summer means, for scaling said limited summed limited head drum speed error value;

third adder means, coupled to said integral term generating means and to said second adder means, for adding said integral term and said feed forward term, thereby generating a feed forward-compensated integral term;

fourth adder means, coupled to said third adder means and to said proportional term generating means, for adding said feed forward-compensated integral term to said proportional term, thereby generating a motor energy loss-compensated head drum drive value signal;

limiter means, coupled to said fourth adder means, for limiting said motor energy loss-compensated head drum drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited head drum drive value on the head drum; and controller means, coupled to said head drum encoder means, to said invertor/scaler means, to said first, second, third, and fourth adder means, to said proportional term generating means, to said integral term generating means, and having inputs for the target speed and motor energy loss, for controlling the head drum rotational speed.

9. In a digital data storage magnetic tape system having a rotary head drum coupled to a head drum motor, a head drum servo-control system comprising:

head drum encoder means, coupled to the head drum, for generating a periodic signal having a period being inversely proportional to the head drum rotational speed;

invertor/scaler means, coupled to said head drum encoder means, for converting said head drum encoder period to a measured head drum speed;

first scaler means, having a head drum target speed input, for scaling the head drum target speed;

second scaler means, having a head drum target speed input, for scaling the head drum target speed;

first adder means, coupled to said invertor/scaler means and to said first scaler means, for comparing said measured head drum speed to said scaled head drum target speed, and for generating a head drum speed error value therefrom;

second adder means, coupled to said second scaler means, and having a motor energy loss term input thereto, for adding said scaled head drum target speed and said motor energy loss term and for generating a motor energy loss-compensated head drum target speed feed forward value;

motor driver means, coupled to the head drum motor, for driving the head drum motor;

proportional term generating means, coupled to said first adder means, for generating a proportional adjusting term for said motor driver means;

integral term generating means, coupled to said first adder means, for driving small long-term errors to zero;

third adder means, coupled to said integral term generating means and to said second adder means, for adding said integral term and said feed forward term, thereby generating a feed forward-compensated integral term;

fourth adder means, coupled to said third adder means and to said proportional term generating means, for adding said feed forward-compensated integral term to said proportional term, thereby generating a motor energy loss-compensated head drum drive value signal;

limiter means, coupled to said fourth adder means, for limiting said motor energy loss-compensated head drum drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited head drum drive value on the head drum;

controller means, coupled to said head drum encoder means, to said invertor/scaler means, to said first, second, third, and fourth adder means, to said proportional term generating means, to said integral term generating means, and having inputs for the target speed and motor energy loss, for controlling the head drum rotational speed; and said proportional term generating means is further coupled to an output of said third adder means, thereby variably limiting the proportional term depending on the value of the feed forward-compensated integral term.

10. In a digital data storage magnetic tape system having a rotary head drum coupled to a head drum motor, a head drum servo-control system comprising:

head drum encoder means, coupled to the head drum, for generating a periodic signal having a period being inversely proportional to the head drum rotational speed;

invertor/scaler means, coupled to said head drum encoder means, for converting said head drum encoder period to a measured head drum speed;

first scaler means, having a head drum target speed input, for scaling the head drum target speed;

second scaler means, having a head drum target speed input, for scaling the head drum target speed;

first adder means, coupled to said invertor/scaler means and to said first scaler means, for comparing said measured head drum speed to said scaled head drum target speed, and for generating a head drum speed error value therefrom;

second adder means, coupled to said second scaler means, and having a motor energy loss term input thereto, for adding said scaled head drum target speed and said motor energy loss term and for generating a motor energy loss-compensated head drum target speed feed forward value;

motor driver means, coupled to the head drum motor, for driving the head drum motor;

proportional term generating means, coupled to said first adder means, for generating a proportional adjusting term for said motor driver means;

integral term generating means, coupled to said first adder means, for driving small long-term errors to zero;

third adder means, coupled to said integral term generating means, and to said second adder means, for adding said integral term and said feed forward term, thereby generating a feed forward-compensated integral term;

fourth adder means, coupled to said third adder means and to said proportional term generating means, for adding said feed forward-compensated integral term to said proportional term, thereby generating a motor energy loss-compensated head drum drive value signal;

limiter means, coupled to said fourth adder means, for limiting said motor energy loss-compensated head drum drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited head drum drive value on the head drum;

controller means, coupled to said head drum encoder means, to said invertor/scaler means, to said first, second, third, and fourth adder means, to said proportional term generating means, to said integral term generating means, and having inputs for the target speed and motor energy loss, for controlling the head drum rotational speed; and said proportional term generating means comprises proportional term scaler means for scaling said head drum speed error value and proportional term limiter means, coupled to said proportional term scaler means, for limiting said scaled head drum speed error value within predetermined upper and lower thresholds to prevent arithmetic overflow, said proportional term limiter means being coupled to said output of said third adder means, thereby providing symmetric upper and lower limiting over a substantially large range of values.

11. In a digital data storage magnetic tape system having a rotary head drum coupled to a head drum motor, a head drum servo-control system comprising:

head drum encoder means, coupled to the head drum, for generating a periodic signal having a period being inversely proportional to the head drum rotational speed;

invertor/scaler means, coupled to said head drum encoder means, for converting said head drum encoder period to a measured head drum speed;

first scaler means, having a head drum target speed input, for scaling the head drum target speed;

second scaler means, having a head drum target speed input, for scaling the head drum target speed;

first adder means, coupled to said invertor/scaler means and to said first scaler means, for comparing said measured head drum speed to said scaled head drum target speed, and for generating a head drum speed error value therefrom;

second adder means, coupled to said second scaler means, and having a motor energy loss term input thereto, for adding said scaled head drum target speed and said motor energy loss term and for generating a motor energy loss-compensated head drum target speed feed forward value;

motor driver means, coupled to the head drum motor, for driving the head drum motor;

proportional term generating means, coupled to said first adder means, for generating a proportional adjusting term for said motor driver means;

integral term generating means, coupled to said first adder means, for driving small long-term errors to zero;

third adder means, coupled to said integral term generating means and to said second adder means, for adding said integral term and said feed forward term, thereby generating a feed forward-compensated integral term;

fourth adder means, coupled to said third adder means and to said proportional term generating means, for adding said feed forward-compensated integral term to said proportional term, thereby generating a motor energy loss-compensated head drum drive value signal;

limiter means, coupled to said fourth adder means, for limiting said motor energy loss-compensated head drum drive value signal;

digital-to-analog converter (DAC) means, coupled to said limiter means and to said motor driver means, for converting said motor energy loss-compensated drive value signal to an analog signal and transmitting said analog signal to said motor driver means, which in turn sets a torque responsive to said motor energy loss-compensated limited head drum drive value on the head drum;

controller means, coupled to said head drum encoder means, to said invertor/scaler means, to said first, second, third, and fourth adder means, to said proportional term generating means, to said integral term generating means, and having inputs for the target speed and motor energy loss, for controlling the head drum rotational speed, said head drum servo-control system having a bandwidth being substantially 30 Hz.

* * * * *